UNITED STATES PATENT OFFICE.

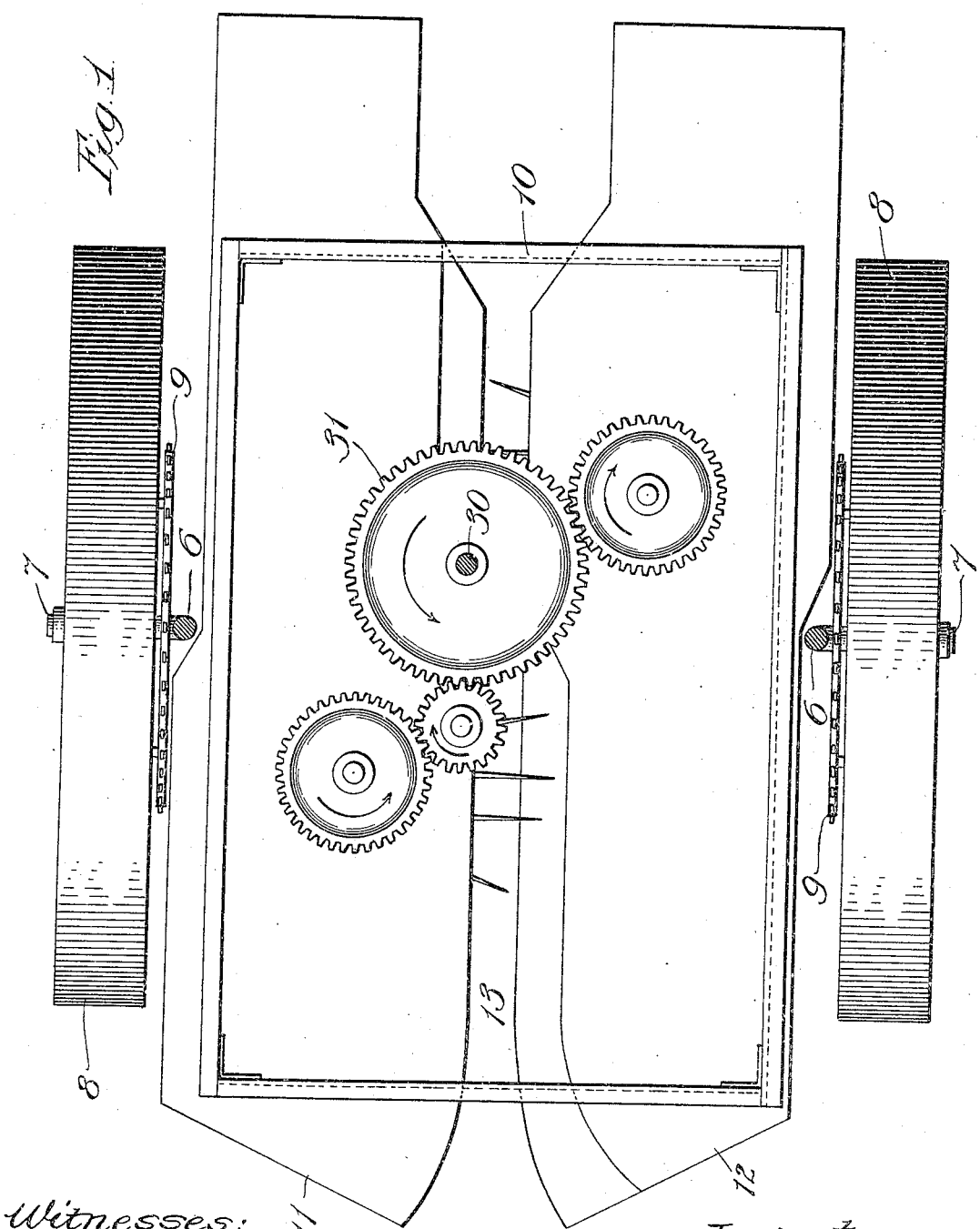

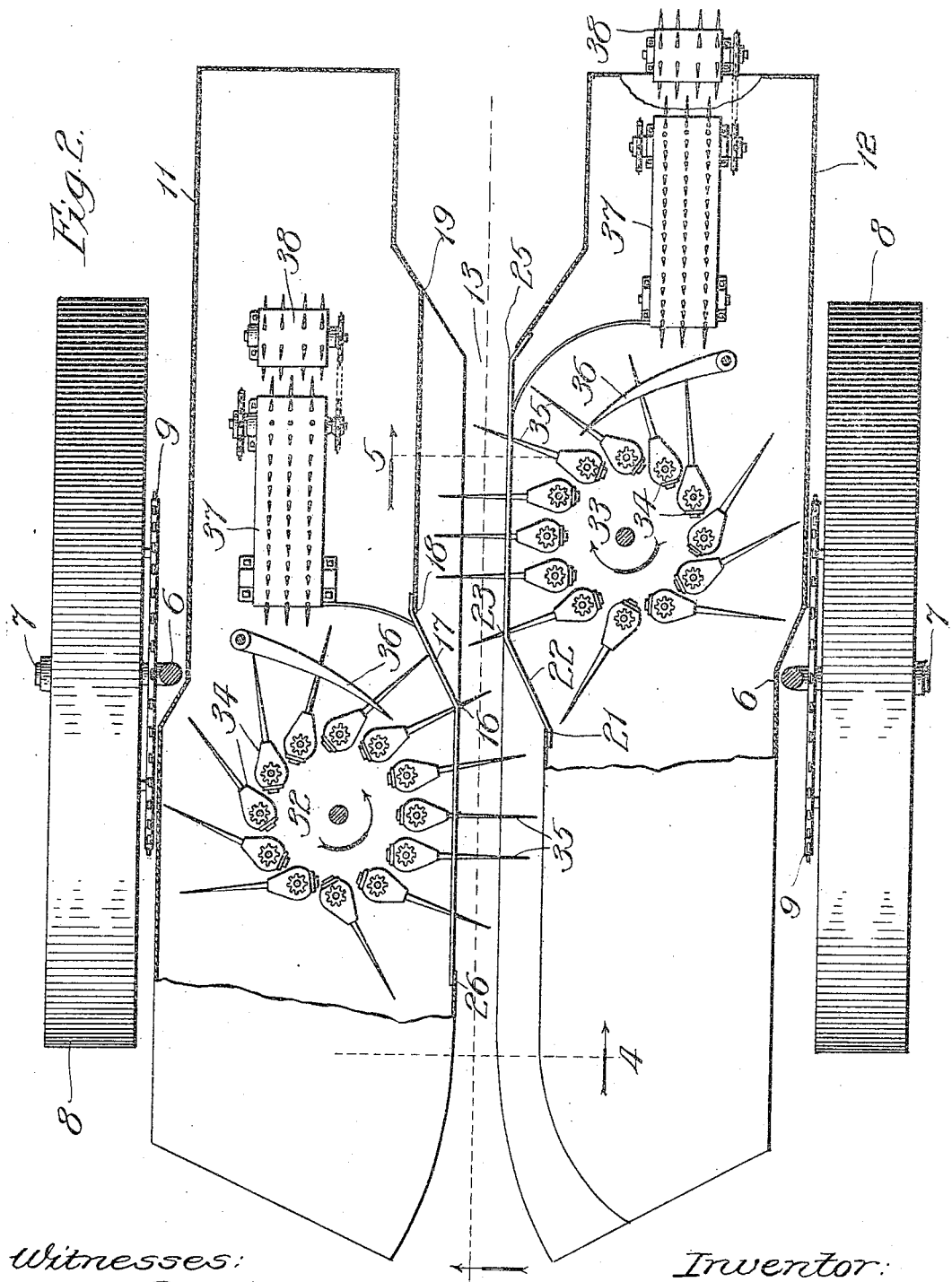

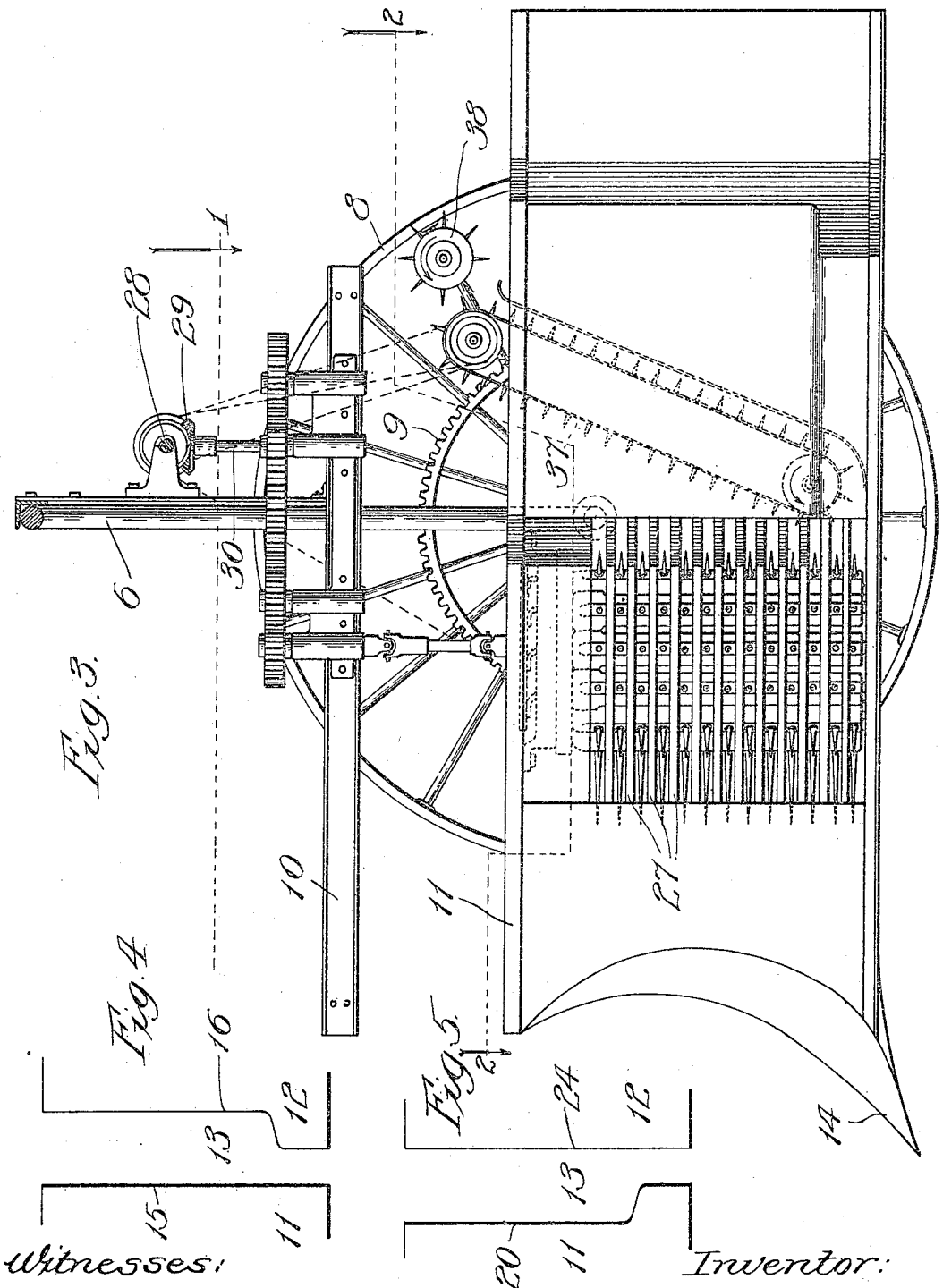

RUDOLPH C. SCHERLING, OF CHICAGO, ILLINOIS, ASSIGNOR TO H. E. & J. E. BULLOCK, OF CHICAGO, ILLINOIS, A FIRM.

COTTON-HARVESTER.

952,688.  Specification of Letters Patent.  Patented Mar. 22, 1910.

Application filed August 31, 1908. Serial No. 451,003.

*To all whom it may concern:*

Be it known that I, RUDOLPH C. SCHERLING, a citizen of the United States, residing at Chicago, in the county of Cook and State of Illinois, have invented a new and useful Improvement in Cotton-Harvesters, of which the following is a specification.

My invention relates to improvement in cotton-harvesting machines of the general type in which a frame mounted on wheels supports picker-mechanisms on each side of a plant-embracing space or passage, the picker-mechanisms being actuated in the travel of the machine to pick the cotton from open bolls in the plants.

It has been usual hitherto, in cotton-harvesters of this type, to mount the cotton-picking mechanisms directly opposite each other, whereby they would work in each plant simultaneously from opposite sides, and to render their operation more effective it has been usual to cause the picker-fingers to intermesh with each other in the plants. This has made it necessary to contract the plants by crowding and deflecting the branches simultaneously from opposite sides, with the result of breaking branches and knocking off green bolls; furthermore, the mechanisms necessary to cause the picker-stems to intermesh with proper exactness have been necessarily complicated and difficult to keep in proper working order.

My object is greatly to improve the construction and operation of machines of this class by causing the pressure of the machine against plants to occur from one side at a time only, thereby permitting the stalks to yield slightly and sufficient deflection of the limbs to be produced with little danger of breaking them or knocking off green bolls; and it is further my object to insure engagement of picker-stems with all open bolls without the necessity of their intermeshing from opposite sides for the purpose.

In the accompanying drawings, which illustrate my invention, I have left out certain details of construction common to machines of this type, and therefore understood, and which form no part of my invention.

Referring to the drawings—Figure 1 is a sectional plan view of the machine taken on line 1 in Fig. 3; Fig. 2, a partly sectional plan view, the section being taken on the irregular line 2—2 in Fig. 3; Fig. 3, a section taken on line 3 in Fig. 2; and Figs. 4 and 5, diagrams in the nature of vertical sections taken, respectively, on lines 4 and 5 in Fig. 2, illustrating the central plant embracing and alternately deflecting passage.

6 is a U-shaped, or stirrup, frame, the legs of which terminate in axles 7 on which the wheels 8 are journaled. Attached to the said wheels and rotating therewith are sprocket-wheels 9. Secured to the stirrup-frame 6 is a horizontal frame portion 10 of rectangular shape which may be constructed of channel-bars, as indicated. 11 and 12 are parallel casings forming parts of the frame of the machine suspended from the frame portion 10 and spaced apart to leave a passage 13 between them. Each casing is rounded toward the front to render the forward end of the passage 13 flaring and the lower forward ends of the casings are shaped, as indicated in Fig. 3, to produce the gathering projections 14 common in harvesting machines.

The inner face of the casing 11 forming one wall of the passage 13 is flat, as shown by the surface 15 in Fig. 4, from the front of the machine to the point 16 (Fig. 2). From thence the upper part of the wall recedes as indicated at 17 in Fig. 2 to the point 18, whence to the point 19 the wall is retracted or recessed, being shaped as shown by the surface 20 in Fig. 5. The inner wall of the casing 12 is shaped as indicated by the surface 16 in Fig. 4 from the front of the machine to the point 21, whence the upper part extends at an angle as indicated at 22 to the point 23, whence the wall extends as indicated by the surface 24 (in Fig. 5) to the point 25 in Fig. 2.

It will be understood from the drawings and foregoing description that the lower part of the passage 13 is narrow nearly throughout, but of ample width to receive the stalks of cotton plants below the branches thereof; and that along the forward part of the machine the upper, or branch-embracing, portion of the passage is widened at one side of its central line, and along the afterpart of the machine it is widened at the other side of its central line.

The inner wall of the casing 11 from the point 26 to the point 18 is formed of parallel slats 27, as indicated in Fig. 3; and the inner wall of the casing 12 is also formed of parallel slats from the point 21 to the point 25.

In the machine illustrated, a shaft 28 suitably journaled on the stirrup frame and extending over the casings 11 and 12 carries sprocket-pinions geared by means of chains to the sprocket-wheels 9. The shaft 28 carries a bevel gear engaging a bevel gear 29 on a vertical shaft 30 which carries a large gear 31.

32 and 33 are picker-mechanisms which, being of common construction, will be understood from the illustrations. The said mechanisms are operated from the gear 31 through the gears illustrated in Fig. 1 to cause the picker-stem carriers 34 to travel and turn in the general manner indicated, and cause the picker-stems 35 to be rotated on their individual axes, while moving in the spaces between slats 27, and then drawn through stripper-fingers 36 in the usual way. It is to be understood, of course, that while projecting into the passage 13 the rotating picker-stems move in the backward direction at a speed approximating that of the forward travel of the machine.

In operation, as the machine is drawn or propelled across a row of cotton plants in a field, the plants are received by the passage 13, and the branches thereof at the side toward the casing 11 are deflected or flattened out by contact therewith of the wall surface 15 formed in part, as before stated, by the parallel slats 27. The branches at the other side of the plant are not crowded or flattened out to any material extent owing to the retracted or recessed nature of the opposite wall of the passage, as described. The plants are thus held and steadied in a manner to permit the picker-mechanism 32 to engage and abstract cotton from most, at least, of the open bolls of the plant. As the point 16 passes a plant, the latter is crowded by the surface portion 24 of the casing 12 to deflect and flatten out the branches on that side of the plant, while, after passing the point 16, the previously crowded and deflected branches are permitted to expand into the recess formed by the retracted surface 20. While the plants are deflected by the surface 24, which is formed of slats as stated, the picker-mechanism 33 operates to pick any remaining cotton from open bolls.

In the machine shown, the cotton stripped from the picker-stems by the fingers 36 falls to the base of an elevator 37 in each casing and is carried up to a discharging roller 38.

As my present invention deals only with the general location of the picker-mechanisms with relation to each other and the plant embracing and alternately deflecting passage, the form of the frame, the picker-mechanisms and other details of construction may be variously modified without departing from the spirit of my invention as defined by the claims.

What I claim as new, and desire to secure by Letters Patent, is—

1. In a cotton-harvester, the combination of a traveling frame having a plant-embracing and alternately deflecting passage through it, and picker-mechanisms respectively located one in rear of the other and working from opposite sides of said passage in the same, substantially as and for the purpose set forth.

2. In a cotton-harvester, the combination of a traveling frame having walls forming between them a plant-embracing passage; the wall at one side being slotted and shaped to operate as a branch deflector, and the wall at the other side being retracted along the branch-receiving portion, and picker-mechanism working through said slotted wall into said passage.

3. In a cotton-harvester, the combination of a traveling frame having walls forming between them a plant-embracing passage, the walls being constructed to produce slotted branch deflectors one in rear of the other on opposite sides of the passage, the wall portions opposite the said deflectors being retracted, and picker-mechanisms respectively located one in rear of the other and working from opposite sides of said passage into the same through said slotted deflecting wall-portions.

4. In a cotton-harvester, the combination of a traveling frame having casings forming the side walls of a plant-embracing passage, one wall being retracted along the forward part only of the branch-receiving portion of the passage, the other wall being retracted along the after-part only of the branch-receiving portion of the passage, and a picker-mechanism in each casing opposite the retracted wall-portion of the other casing.

RUDOLPH C. SCHERLING.

In presence of—
  A. U. THORIEN,
  R. A. SCHAEFER.